US007289541B2

(12) United States Patent
Elam

(10) Patent No.: US 7,289,541 B2
(45) Date of Patent: Oct. 30, 2007

(54) METHOD FOR LOCATING AND TRACKING COMMUNICATION UNITS IN A SYNCHRONOUS WIRELESS COMMUNICATION SYSTEM

(75) Inventor: Daryl B. Elam, Benson, AZ (US)

(73) Assignee: Raytheon Company, Waltham, MA (US)

( * ) Notice: Subject to any disclaimer, the term of this patent is extended or adjusted under 35 U.S.C. 154(b) by 1067 days.

(21) Appl. No.: 10/313,473

(22) Filed: Dec. 4, 2002

(65) Prior Publication Data

US 2004/0109475 A1 Jun. 10, 2004

(51) Int. Cl.
*H04J 3/06* (2006.01)
*H04J 3/07* (2006.01)

(52) U.S. Cl. ........................ 370/508; 370/503; 370/509
(58) Field of Classification Search ................ 370/335, 370/321, 347, 337, 508, 252, 503
See application file for complete search history.

(56) References Cited

U.S. PATENT DOCUMENTS

| | | | | |
|---|---|---|---|---|
| 3,742,498 | A | * | 6/1973 | Dunn .......................... 342/88 |
| 3,886,553 | A | | 5/1975 | Bates |
| 5,099,245 | A | | 3/1992 | Sagey |
| 5,262,784 | A | | 11/1993 | Drobnicki et al. |
| 5,550,992 | A | * | 8/1996 | Hashimoto .................. 370/337 |
| 5,872,774 | A | * | 2/1999 | Wheatley et al. ........... 370/335 |
| 6,016,322 | A | * | 1/2000 | Goldman ..................... 370/508 |
| 6,188,354 | B1 | | 2/2001 | Soliman et al. |
| 6,198,935 | B1 | | 3/2001 | Saha et al. |
| 6,208,871 | B1 | | 3/2001 | Krzystyniak |
| 6,289,211 | B1 | | 9/2001 | Koorapaty et al. |
| 6,317,602 | B1 | | 11/2001 | Wesby |
| 6,400,314 | B1 | * | 6/2002 | Krasner .................. 342/357.09 |
| 7,142,154 | B2 | * | 11/2006 | Quilter et al. ......... 342/357.06 |
| 2001/0046240 | A1 | * | 11/2001 | Longoni et al. ............ 370/503 |

FOREIGN PATENT DOCUMENTS

| | | |
|---|---|---|
| GB | 2277232 | 10/1994 |
| WO | WO 01/52461 | 7/2001 |

OTHER PUBLICATIONS

Joa-Ng M et al: "A Novel Spread Spectrum-Based Synchronization and Location Determination Method for Wireless System" IEEE Communications Letters, IEEE Service Center, Piscataway, US, US, vol. 3, No. 6, Jun. 1999, pp. 177-179, XP000830991, etc.

* cited by examiner

*Primary Examiner*—Chirag G. Shah
(74) *Attorney, Agent, or Firm*—Schwegman, Lundberg & Woessner, P.A.; Gregory J. Gorrie

(57) ABSTRACT

A method for locating and tracking communication units in a synchronous wireless communication system allows for system synchronization and communication unit location when usable GPS signals are not available or are being jammed. Communication units communicate within frames that are synchronized with a timing-reference signal. The timing-reference signal may be generated from GPS signals when available or generated from TOA and trajectory extrapolations when the GPS signals are not available. A disciplined oscillator may be used to maintain substantial synchronization over a few seconds of a frame. In one embodiment, propagation delays of received signals within the frame are determined and provided to other communication units allowing one or more communication units to calculate locations of the communication units. The location information may be reported to the other communication units for use in the self-synchronization.

17 Claims, 5 Drawing Sheets

METHOD FOR LOCATING AND TRACKING COMMUNICATION UNITS IN A SYNCHRONOUS WIRELESS COMMUNICATION SYSTEM

TECHNICAL FIELD

The present invention pertains to wireless communications, and in particular, to wireless communication systems with moving communication units, and more particularly to communication systems that use synchronous wireless data links for communication between system elements.

BACKGROUND

Many wireless communication systems depend on global positioning system (GPS) signals for precise location and tracking of communication units. These systems are increasingly vulnerable because of the relative simplicity and ease in which the GPS signals can be jammed. This is a problem especially in combat situations where battlefield communication systems and/or weapon systems rely heavily on GPS signals.

Thus, there is a general need for an improved wireless communication system and method for communicating. There is also a need for a synchronous wireless communication system and method for locating and tracking communication units. There is also a need for a synchronous wireless communication system and method that allows for system synchronization when GPS signals are not available or are being jammed. There is also a need for a synchronous wireless communication system and method that allows for communication unit location determination when GPS signals are not available or are being jammed.

SUMMARY

A synchronous wireless communication system and method for locating and tracking communication units allows for system synchronization and communication unit location determination when GPS signals are not available or are being jammed. Communication units communicate within time frames that are synchronized with a timing-reference signal. The timing-reference signal may be generated from GPS signals when available or generated from time-of-arrival (TOA) and trajectory extrapolations when the GPS signals are not available. A disciplined oscillator may be used to maintain synchronization over a portion (e.g., few seconds) of a frame. In one embodiment, propagation delays of signals received within the frame are determined and provided to other communication units allowing one or more communication units to calculate locations of the communication units. The location information may be reported to the other communication units for use in the self-synchronization.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides, among other things, a method for locating and/or tracking communication units in a synchronous wireless communication system. The method is robust, substantially autonomous, and may be substantially jam-resistant. The method of the various embodiments does not require complete reliance on GPS signals, which may be jammed or otherwise unable to be accurately received.

Figure 1:
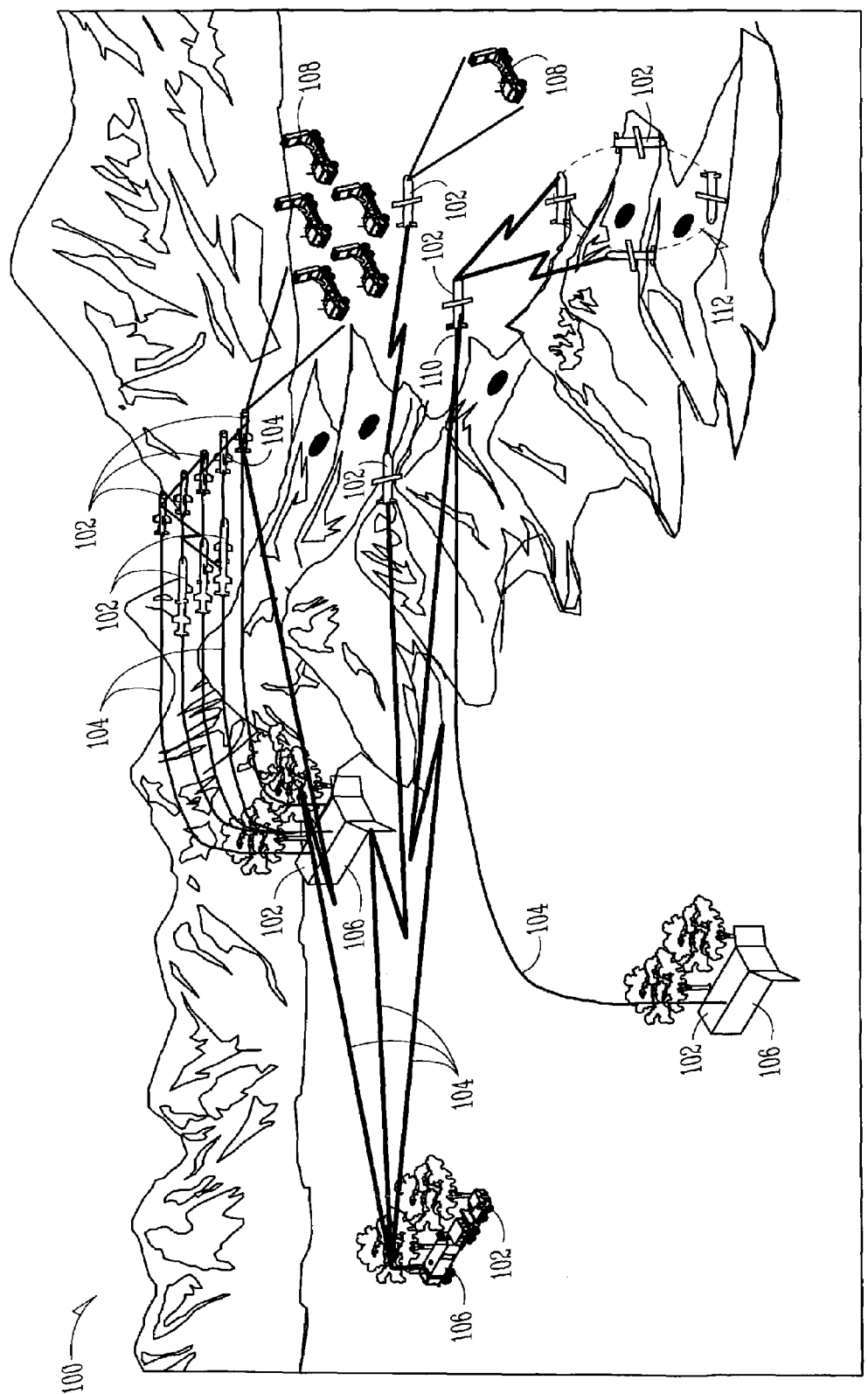
FIG. 1 illustrates an operational environment in which embodiments of the present invention may be practiced.

FIG. 1 illustrates an operational environment in which embodiments of the present invention may be practiced. Operational environment 100 may include a plurality of communication units 102 that may communicate with each other using synchronous wireless communications over links 104. Communication units 102 may be almost any type of communication device capable of two-way wireless synchronous communications. Communication units 102 may be carried in aircraft, ground vehicles, guided projectiles and missiles. Some of communication units 102 may be in motion and may have a trajectory associated therewith, while some communication units, such as reference communication units 106, may not necessarily be in motion. In at least one embodiment wherein communication units include guided projectiles or missiles, some communication units 102 may be directed to one or more targets 108.

Although environment 100 is illustrated as a battlefield environment, embodiments of the present invention may be practiced in almost any environment. For example, when communication units 102 are two-way radios, environment 100 may be a city-type environment.

In accordance with embodiments of the present invention, a geographic location of one or more of communication units 102 may be determined using synchronous wireless communications. Each communication unit 102 may be synchronized with a synchronization signal, which may indicate a beginning of a communication frame. In these embodiments, communications are received from other communication units within the frame. Each communication unit transmits during a preassigned time-slot of the frame. Propagation delays may be determined from the received communications for at least some of the other communication units, and a location of at least one of the communication units may be calculated from the propagation delays.

In one embodiment, the synchronization signal may be a timing-reference signal derived from GPS signals received by the communication units. This timing-reference signal may be synchronized for each of the communication units. In another embodiment, the communication units may generate a self-synchronization signal based on a previously determined location for at least one of the communication units, time of arrival (TOA) information and/or trajectory extrapolations for the communication units. The timing-reference signal, which is based on the self-synchronization signal, may be substantially synchronized for each of the communication units to indicate the beginning of the communication frame. In one embodiment, the self-synchronization signal is generated when GPS signals are not available for derivation of a timing-reference signal. Self-synchronization may provide for continued operation of the synchronous wireless communication system when it would otherwise fail in the absence of GPS-based synchronization signals.

Figure 2:
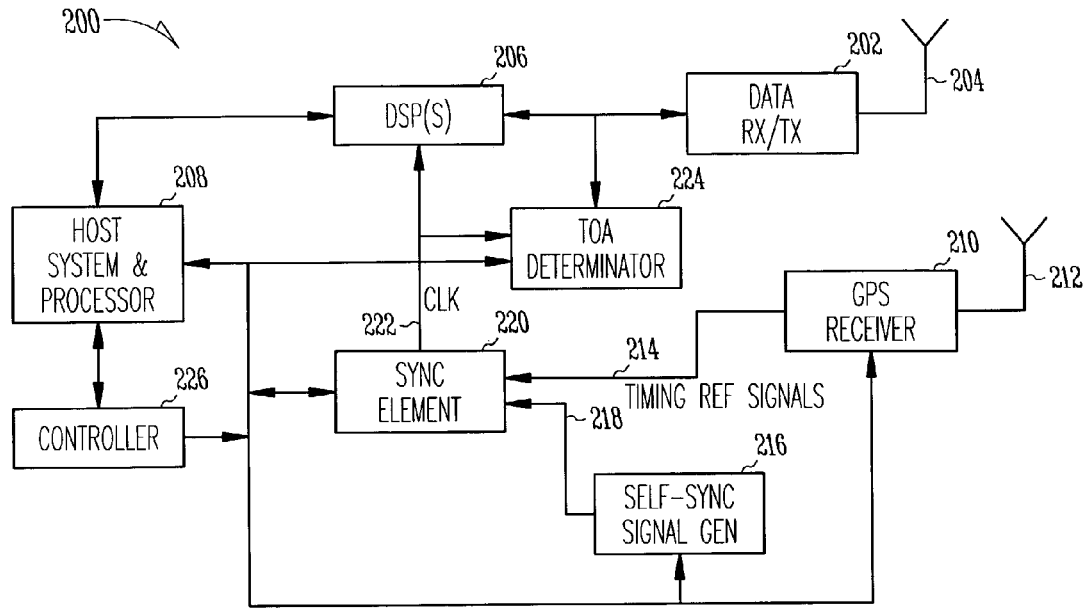
FIG. 2 is a functional block diagram of wireless communication unit in accordance with an embodiment of the present invention.

FIG. 2 is a functional block diagram of wireless communication unit in accordance with an embodiment of the present invention. Communication unit 200 may be suitable for use as any one of communication units 102 (FIG. 1) although other devices and configurations may also be suitable. In one embodiment, communication unit 200 communicates using synchronous wireless communications and may receive and/or transmit during a preassigned portion of communication frame. Communication unit 200 may include data receiver/transmitter element 202 to receive and/or transmit packetized data in accordance with a predetermined protocol using antenna 204. Data receiver/transmitter element 202 may down convert, demodulate and digitize received signals to provide a data signal to digital signal processor (DSP) 206, and may convert a data signal received from DSP 206 to an RF signal for transmission by antenna 204. Data receiver/transmitter element 202 may include a power amplifier, a receiver front end, one or more filters, frequency converters, A/D converters and a transmission rejection switch.

DSP 206 may perform signal-processing functions and may communicate information such as command and/or data signals with host system 208 for use in serving a primary purpose of the communication unit. For example, in the case of a two-way radio or base station equipment, DSP 206 may communicate digitized voice signals as well as communication parameters with host system 208. In the case of guided projectiles, missiles or ground stations in a battlefield environment, DSP 206 may communicate video and/or control data with host system 208 depending on the particular application.

Communication unit 200 may also include an optional GPS receiver 210 which may receive GPS signals from GPS satellites through antenna 212. GPS receiver may generate location information for use by host system 208 through the receipt of the GPS signals. In one embodiment, GPS receiver 210 derives timing-reference signal 214 from the GPS signals for use by unit 200 in synchronous communications with other units. In one embodiment, some or all communication units 102 (FIG. 1) operating in environment 100 (FIG. 1) may derive timing-reference signal 214 from received GPS signals. In this embodiment, timing-reference signal 214 may be synchronized for each communication unit, allowing wireless communications therebetween to be precisely synchronized. Timing-reference signal 214, for example, may be a one pulse-per-second signal.

Communication unit 200 may also include self-synchronization signal generator 216 which may generate timing-reference signal 218. Self-synchronization signal generator 216 may be operable when GPS signals are not available to GPS receiver 210 and GPS receiver is unable to provide timing-reference signal 214. In one embodiment, timing-reference signal 218 generated by signal generator 216 is preferably substantially synchronized with timing-reference signals generated by other communication units 102 (FIG. 1) operating in environment 100 (FIG. 1), even when GPS signals are not available to the other communication units. In one embodiment, controller 226 may determine whether the timing-reference signal is provided by GPS receiver 210 or self-synchronization signal generator 216. In another embodiment, GPS receiver 210 may directly provide an indicator to signal generator 216 when it is unable to generate timing-reference signal 214.

In one embodiment, timing-reference signal 218 may be based on a TOA reference point established by a protocol signal. The substantial synchronization of timing-reference signal 218 with the timing-reference signal of other communication units 102 (FIG. 1) may be achieved through the use of location information for one or more communication units, propagation delay information and trajectory extrapolations for other communication units. This information may be provided by host system 208.

In one embodiment, controller 226 may monitor data provided by GPS receiver 210 to determine GPS signal to noise ratios (SNRs) for signals received from the GPS satellites. In this embodiment, controller 226 may direct synchronization element 220 to use timing-reference signal 218 instead of timing-reference signal 214 when the SNRs are too low (e.g., below a predetermined threshold).

In one embodiment, the timing-reference signal, which may be generated by either GPS receiver 210 or self-synchronization signal generator 216, is provided to synchronization element 220 once per communication frame. In this embodiment, synchronization element 220 may generate clock signal 222 for use by DSP 206 in communicating during preassigned time-slots of a frame. In one embodiment, synchronization element 220 of each communication unit operating in a system may employ a precision oscillator for use in generating clock signal 222 to maintain substantial synchronization between units during a frame.

TOA determinator 224 may determine time of arrival (TOA) information from received signals based on clock signal 222. In one embodiment, TOA determinator 224 may determine propagation delays for signals received from different communication units with a communication frame. These propagation delays may be used by synchronization signal generator 216 in generating timing-reference signal 218.

In one embodiment, antenna 204 and/or antenna 212 may include one or more directional antennas and may employ low probability of detection/intercept technology to reduce the probability of jamming data link and/or GPS signals helping communication unit 200 operate in a high-jamming environment. Although antennas 204 and 212 are illustrated as separate elements, in one embodiment, the function of antennas 204 and 212 may be performed by a single antenna or single set of antennas.

Although communication unit 200 is illustrated as having several separate functional elements, one or more of the functional elements may be combined and may be implemented by combinations of software configured elements, such as processors including digital signal processors (DSPs), and/or other hardware elements. In one embodiment, portions of unit 200 may be implemented within communication devices utilizing many existing circuits within the communication components of existing system elements.

In one embodiment, synchronization element 220 may comprise a disciplined oscillator. Several implementations of a disciplined oscillator may be suitable for use with embodiments of the present invention. In one implementation, an ordinary, high accuracy, low drift voltage-controlled oscillator (VCO), may be used along with a digital-to-analog converter (DAC), analog circuits, digital logic and a controller. The VCO may have frequency stability specifications of $10^{-7}$ or better. Periodic reference signals (e.g., either timing-reference signal 214 or 218) are supplied by an external source. In one embodiment, the logic and controller may prioritize the use of the two timing-reference signals 214 and 218. The logic may include interfaces to the DAC, timing references and the controller, and may include one or more digital counters, comparators and other logic. In operation, the VCO output may be counted by the digital logic for a period delineated by the timing-reference signal. The resulting count may be filtered and averaged with prior data to establish an error term, which may be used to vary the DAC, which closes the control loop to the VCO. In some embodiments, additional accuracy is obtained by mathematically accounting for frequency errors, which may effect the TOA reference point. This is done as a preprocessing step prior to performing location algorithms discussed below.

Figure 3:
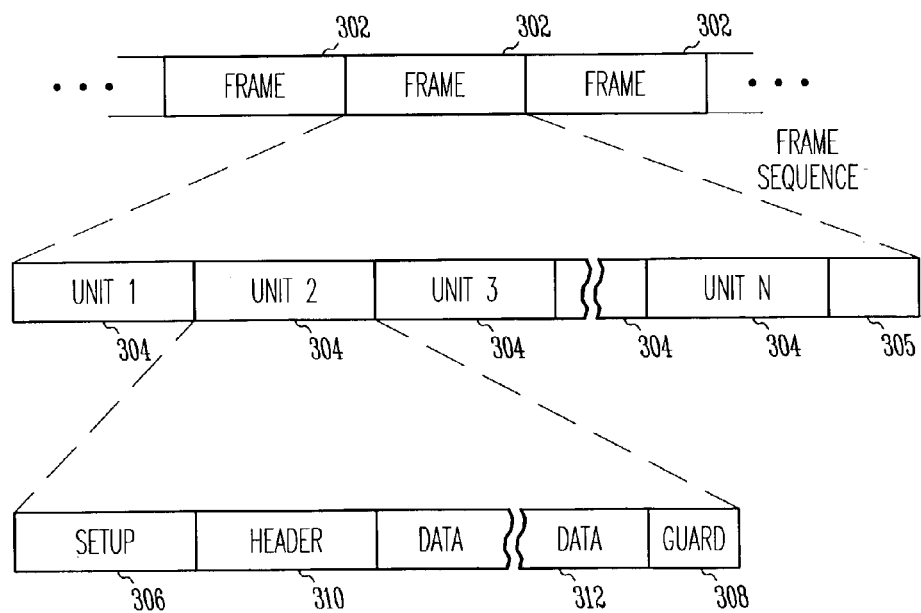
FIG. 3 illustrates communication frames for synchronous communications between wireless communication units in accordance with an embodiment of the present invention.

FIG. 3 illustrates communication frames for synchronous communications between wireless communication units in accordance with an embodiment of the present invention. Communication frames 302 may be used for synchronous wireless communication between communication units, such as communication units 102 (FIG. 1). The beginning of each frames 302 may be synchronized with a timing-reference signal, such as either timing-reference signal 214 or 218 (FIG. 2), generated by the communication units. Each frame 302 may be divided into a plurality of time-slots 304 allowing the communication units to receive or transmit data in one or more of the time-slots. In one embodiment, each communication unit 102 (FIG. 1) may be assigned a particular time-slot permitting a communication unit to communicate during a particular time-slot without interfering with other units. Frames 302 may be repeated on a continual basis.

Communication units communicating within a time-slot may communicate packetized data in accordance with a predetermined protocol. Each time-slot may include set-up time 306 to allow the receiver or transmitter time to prepare for receipt or transmission of a signal, and guard time 308 to allow for time of arrival differences between communications from various communication units. In one embodiment, the packetized data may include header portion 310 and data portion 312. Header portion 310 may include a preamble used for synchronization.

In one embodiment, the preamble of the first time-slot of a frame may include a predetermined or otherwise identifiable bit pattern to allow receiving communication units to easily identify the first time-slot. In this embodiment, this "special" first time-slot may be transmitted by a master communication unit and may provide a way for a "lost" communication unit to synchronize with the system. This may be useful when a communication unit encounters a major glitch causing it to loose synchronization, for example, during flight.

In one embodiment, frame 302 may include one or more report time-slots 305 for use by communication units in exchanging time of arrival information to other communication units, and/or for use by communication units in reporting calculated location information. This is described in more detail below.

In one embodiment, various forms of protocol signaling may be included in a packet. The protocol signaling may include packet headers, link parameters and other non-user-data signals depending on the specific equipment and protocols being used. These non-user-data signals may be fixed in location within the packet protocol interval and therefore may be used as TOA reference points for location solutions implemented by the various embodiments of the present invention.

When the location of any single unit (e.g., a reference unit) in a larger system of units is known, then the entire system of units may be located relative to that single unit. If the single unit's location is known in absolute coordinates then, by association, the locations for all system units may be determined for that coordinate system (such as latitude and longitude referenced to WGS84). If not, then at least the relative locations of the units of the system can be determined. The reference unit does not have to be the same unit for the duration of operation of the system. The unit designated as the reference unit may be changed from time to time and accounted for in the solution computations.

Once a system is synchronized, then the wireless data-links may rely on a GPS derived timing-reference signal (e.g., a one-PPS signal) to maintain synchronization over long periods of time. In accordance with embodiments of the present invention, two techniques may be implemented to relieve dependence on GPS-based timing and thus maintain the TOA-based location capabilities of wireless data-link-based location of the communication units of the large system.

In accordance with the first technique, a disciplined oscillator, which may be embodied in synchronization element 220 (FIG. 2), may be implemented to improve the drift behavior of the timing clock relative to aberrations in the GPS derived timing-reference signal while simultaneously providing much greater hold-up time during short lapses of the timing-reference signal. The disciplined oscillator may be loosely phase-locked to the GPS derived timing-reference signal. A second control loop within element 220 may tightly adjusts the oscillator to a precise frequency. This frequency may be allowed to have substantial long-term drift, but extremely low drift over periods of tens of seconds, for example. Thus by having the same disciplining function utilized in the wireless data-links of each communication unit in the system, a nearly constant relative timing capability exists among them. Relative timing, rather than absolute timing, may be used for TOA-based location and/or for synchronous communication over wireless data-links.

In accordance with the second technique, system self-synchronization may be performed. In this technique, a protocol is utilized in which continuous protocol signaling is performed even when no user-data is transmitted. Just as with using a specific point in the protocol signals as a TOA location reference, that same point may be a surrogate reference, such as reference signal 218 (FIG. 2), in lieu of the GPS derived timing-reference signal for the disciplined oscillators. In this embodiment, a second control loop tightly adjusts the oscillator to a precise frequency. This frequency may be allowed to have substantial long-term drift, but extremely low drift over periods of tens of seconds. In this embodiment, communication units may possess location information of other units so that propagation effects (e.g., the time delays for propagation of transmitted signals) may be accounted for. Accordingly, since locations are an intrinsic part of this embodiment, a closed loop may be formed combining self-synchronization, disciplined oscillators, and TOA-based location solutions without disturbing the existing wireless data communications.

In accordance with embodiments of the present invention, when the GPS derived timing-reference signal is available and deemed valid as a timing reference, it may be used. Otherwise, a self-synchronization signal may be used. In either case, the disciplined oscillator may be used. In the absence of the GPS derived timing-reference signal, the locations of each communication unit may be sent via a wireless data-link to other units of the system in order for each unit to compensate for propagation delay effects. If only some elements have access to a viable GPS signal, these units may be designated as primary reference elements and a hybrid scheme may be used to maintain synchronization for the elements without GPS access. The use of any additional navigation capabilities, such as a missile internal navigation system (INS), may be used to improve location accuracies by allowing interpolation and compensation for position changes during the TOA solution interval. When no acceptable GPS signals are available to communication units during operation, at least one unit may be designated as the location reference point with known location information. In this case, the system may begin a startup phase allowing for certain parameters to become stable before full location accuracies are achieved.

In some embodiments, existing wireless data-link equipment may not need to be extensively modified for the techniques employed by embodiments of the present invention to be implemented. For example, an output of the disciplined oscillator may be substituted for any existing clock source. Some data link equipment may have provisions for an external clock input and thus, may not require modification for the clock signal. Others may have an internal oscillator, usually a high quality TCXO, which may be omitted and the disciplined oscillator output used instead. The reference-timing signal may be tapped into within the data-link equipment. This reference may be provided from several possible sources within data-link equipment, depending on the type of data-link modulation employed and other factors. For example, on a spread spectrum data-link, the commencement of a certain frequency in the sequence or hopping pattern may serve as the reference. In the case of a fixed carrier frequency, the edge of a specific bit in a specific byte in the non-user-data protocol signals may be designated as the time reference. With other types of wireless data-link equipment, the timing-reference signal may be determined according to the details of that communications system. When the various communication units in the system are similar or substantially identical, then relative timing accuracy may be preserved. In some cases the data-link equipment may not easily be modified to provide a digital signal whose accuracy is good enough for the desired location accuracy. In those cases, an external circuit may be employed which will examine an available signal tapped from the data-link equipment (e.g., element 202 (FIG. 2)). This external circuit may then determine the timing reference point. This external circuit may, for example, be combined on the same circuit card assembly as the disciplined oscillator.

Figure 4A:
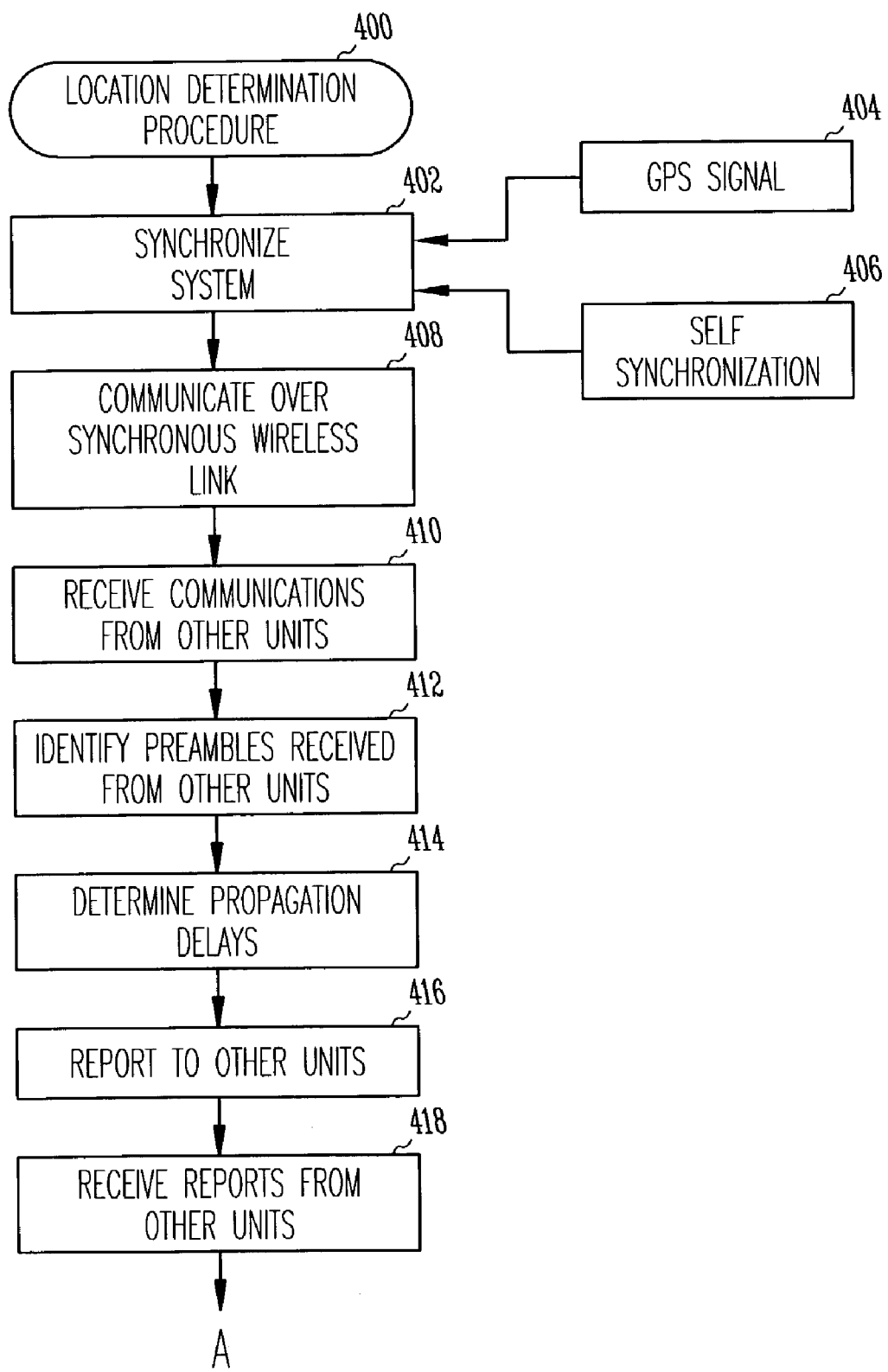
FIGS. 4A and 4B is a flow chart of a location determination procedure in accordance with an embodiment of the present invention.
Figure 4B:
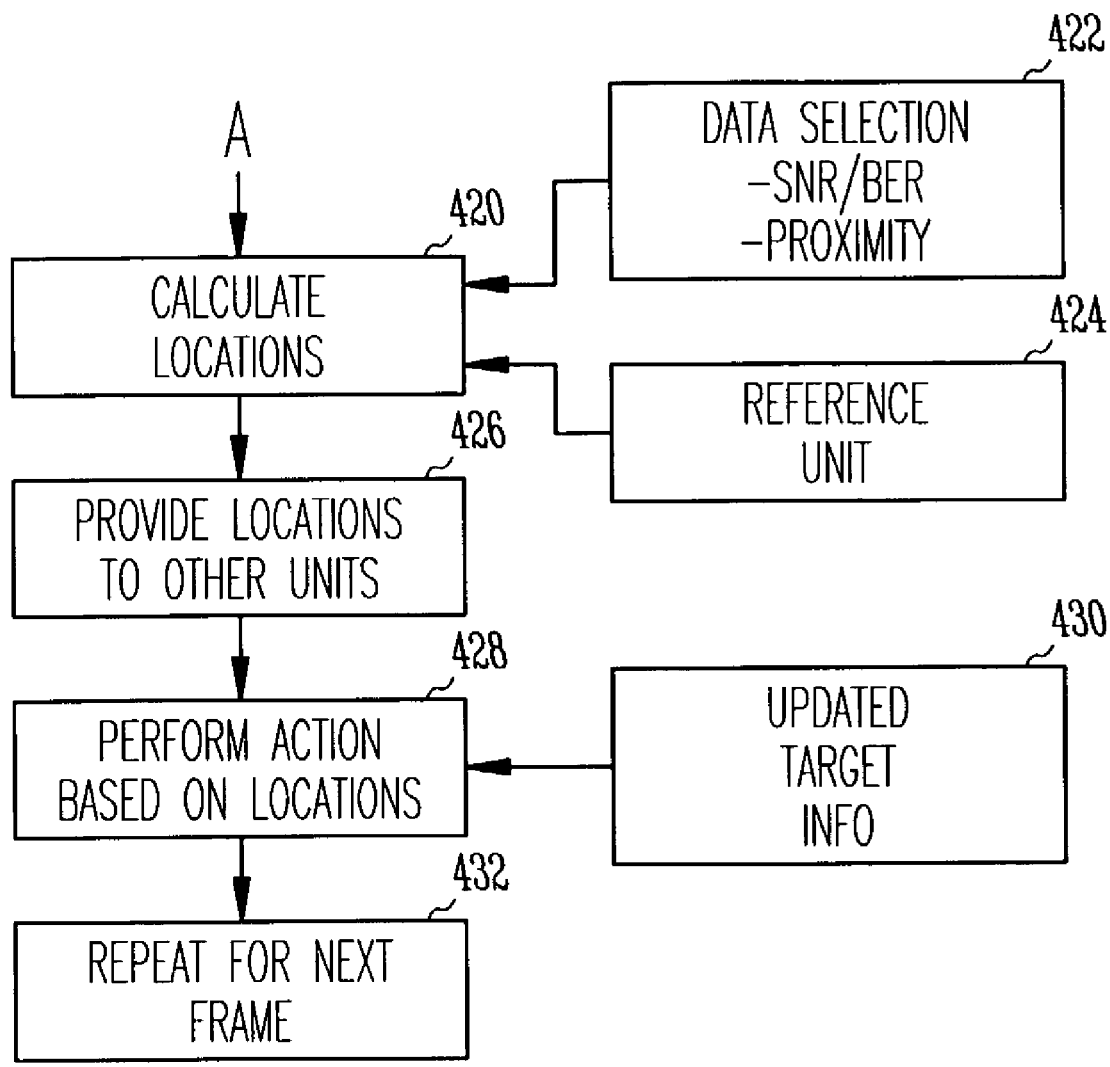

FIGS. 4A and 4B is a flow chart of a location determination procedure in accordance with an embodiment of the present invention. Procedure 400 may be used to determine the location of one or more communication units, such as communication units 102 (FIG. 1), and may be performed by any one of such communication units. In one embodiment, most or all communication units may simultaneously perform procedure 400. In operation 402, a system synchronization is performed. The system synchronization may include the generation of a timing-reference signal, which may be based on received GPS signals 404 or system self-synchronization 406 previously described. The timing-reference signal may be used to indicate a beginning of communication frames for synchronous communication between communication units. In operation 408, the communication unit communicates with one or more other communication units using synchronous wireless communications. In one embodiment, the communication unit may transmit information during a preassigned time-slot within a frame. Time-slots 304 (FIG. 3) may be used for such communications. Operation 408 may serve as the primary purpose of a communication unit. For example, in the case of a two-way radio, the communication unit may communicate voice data. In the case of a guided projectile or missile, the communication unit may communicate battlefield data, such as video, or be provided control and/or guidance data.

During operation 408, the communication unit may receive communications from one or more other communication units during operation 410. This may occur within a single frame, such as from 302 (FIG. 3). Each communication received from other communication units may be received during the particular time-slot allocated to the other communication units. In operation 412, the preamble of communications received from a communication unit assigned a first time-slot of the frame may be identified.

In operation 414, propagation delays may be determined from the communications received in operation 410. For each communication received from another communication unit, a propagation delay may be determined based on an offset from the beginning of the unit's assigned time-slot. In one embodiment, operation 414 may be performed by TOA determinator 224 (FIG. 2).

In operation 416, the propagation delays determined in operation 414 may be reported to other communication units. Operation 416 may be performed during a reporting time-slot (e.g., time-slot 305 FIG. 3) of the current frame. Each communication unit may be allocated a portion of the reporting time for reporting the propagation delays. In operation 418, the communication unit may receive propagation delays from the other communication units. Operations 416 and 418 may be performed in either order.

In operation 420, locations are calculated for communication units based on the propagation delays. In one embodiment, a TOA location technique is employed using the propagation delays reported for a particular communication unit. One of many well established mathematical techniques and/or algorithms for solving for locations based on TOA data may be implemented in operation 420, and may include solutions based on hyperbolic intersections. A hyperbola is a curve defined by a set of all points, which have a constant difference in distance between two points on a plane. Since distance is an analog for the propagation time of radiated energy, then time differences are directly related to actual distance and are therefore useful for hyperbolic intersections. In order for the properties of hyperbolic intersections to be most useful for two-dimensional or three-dimensional location, there should be three or four TOA measuring points (propagation delay measurements) for each communication unit. Some embodiments of the present invention make use of additional measurements to improve the accuracy of the location solutions. A known location of one or more reference units 424, such as unit 106 (FIG. 1), may be used in operation 420 for reference to absolute coordinates.

When additional measurements are available, in one embodiment of the present invention, operation 420 may include data selection 422 which may select certain TOA measuring points based on various criteria. The criteria may include signal quality information, such as received signal to noise ratio (SNR), bit error rate (BER) or proximity to the measuring communication unit. By selecting certain data, data selection 222 may help improve the accuracy of the locations calculated in operation 420.

In one embodiment, operation 420 may be performed by most or all communication units operating in the system, which may allow each communication unit to calculate the location of all communication units. Embodiments of the present invention permit a communication unit to determine at least its own location, and depending on system requirements, the communication unit may determine locations for other communication units. In one embodiment, operation 420 may be performed by as few as one communication unit with available processing power. In other embodiments, operation 420 may be performed by a subset of the communications units that have available processing power.

In operation 426, the locations calculated in operation 420 may be provided to other communication units. Operation 426 may report calculated location information in terms of a particular coordinate system, such as latitude and longitude, or alternatively, operation 426 may report location information as time offsets with an algorithmically convenient local coordinate system. Operation 426 may include reporting the locations during a reporting time-slot of a current frame. In one embodiment, the locations are collected by a certain communication unit, which may be used for managing and controlling other communication units. For example, reference units 106 (FIG. 1) may receive this location information for airborne communication units. In another example, a control communication unit, such as communication unit 110 (FIG. 1) may receive location information for communication units 112 (FIG. 1) under its control. In accordance with some embodiments of the present invention, any communication unit may be a command or control communication unit and may be capable of receiving such data from the other units.

Operations 402 through 426 may be repeated by a communication unit for every frame allowing location information to be continually determined and/or updated on a regular basis, even when GPS signals are not available.

In one embodiment, operation 428 may be performed. In operation 428, an action may be taken based on the location information for a particular communication unit. For example, based on updated target information 430, a control unit may redirect a communication unit depending on the location of the communication unit.

Operation 432 may repeat at least portions of procedure 400 for a next frame. Although the individual operations of procedure 400 are illustrated and described as separate operations, one or more of the individual operations may be performed concurrently and nothing requires that the operations be performed in the order illustrated.

Figure 5:
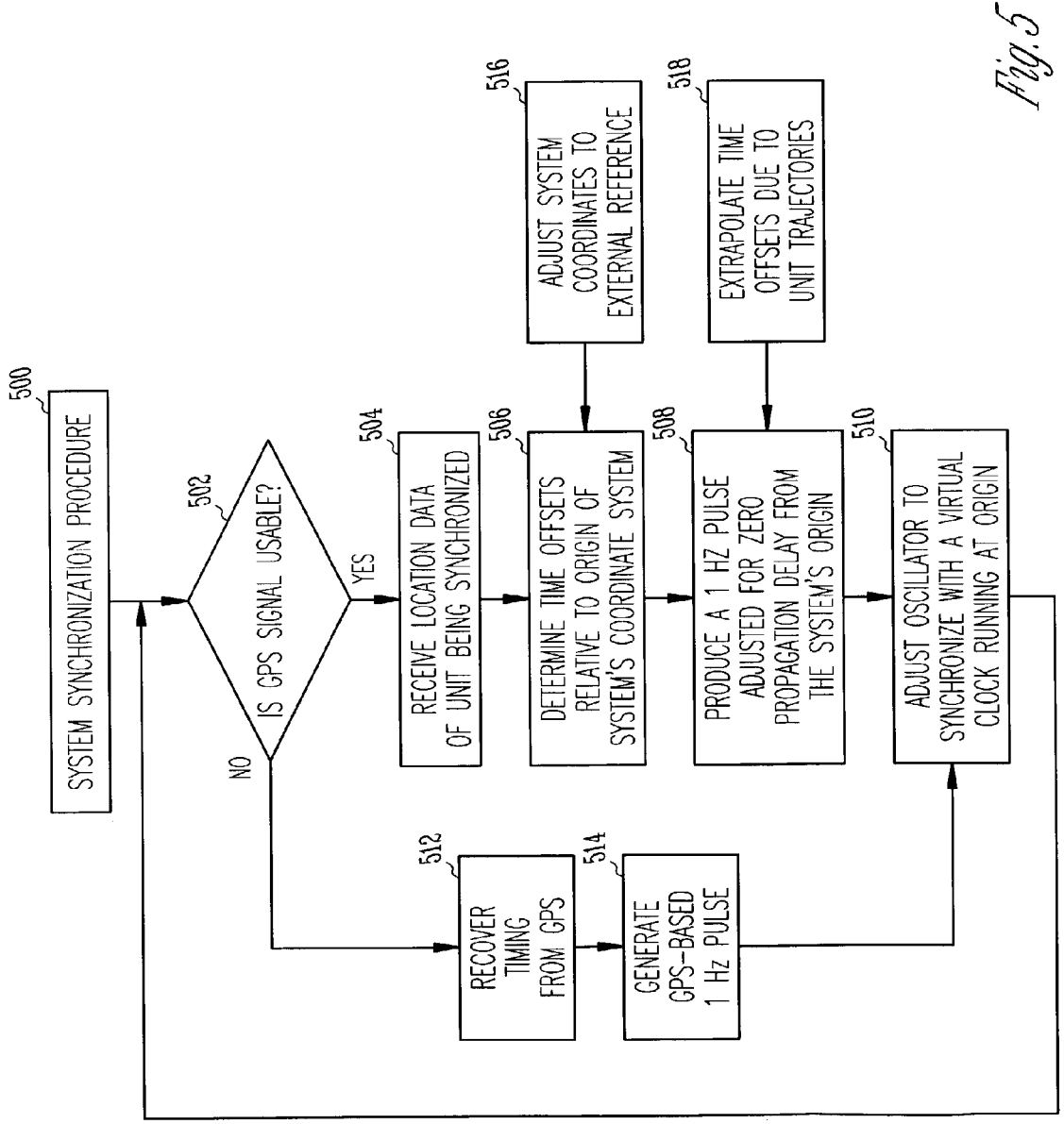
FIG. 5 is a flow chart of a system synchronization procedure in accordance with an embodiment of the present invention.

FIG. 5 is a flow chart of a system synchronization procedure in accordance with an embodiment of the present invention. Procedure 500 may be used to generate a timing-reference signal, such as one of timing-reference signals 214, 218 (FIG. 2) for use in synchronizing communication elements of a system in which the communication elements communicate over synchronous wireless communication links. Procedure 500 may be performed by portions of communication unit 200 (FIG. 2) although other communication units may also be suitable for performing portions of procedure 500. Operation 502 determines if GPS signals are usable for generating a timing-reference signal. When GPS signals are usable for generating a timing-reference signal, operations 512 and 514 are performed in which a timing-reference signal is generated from received GPS signals. When GPS signals are not usable for generating a timing-reference signal, operation 504 is performed. In one embodiment, operation 504 is performed when the available GPS signals are determined to provide less accurate system synchronization than self-synchronization.

In operation 504, the location of the unit may be collected from prior processing. In operation 506 the location data may be converted into time offsets from the origin of the system's local geometric coordinate system, which can be arbitrary. The local, virtual, coordinate system may also be referenced to any external coordinate system such as WGS84 latitude and longitude with data from operation 516. Operation 516 may adjust system coordinates to an external reference.

Operation 508 may take the results of operation 506 and subtract them from the unit's local time mark to produce a timing signal which occurs at the same instant as a similar, virtual, time mark would occur at the origin of the system's local geometric coordinate system. Operation 518 may extrapolate the effect of the unit's movement or trajectory during a location determination procedure (e.g., procedure 400 FIG. 4) and during system synchronization procedure 500. Operation 518 may also take into account the location data latencies through the wireless network to produce additional correction factors to improve timing and location accuracies. Operation 508 may take in account those correction factors determined in operation 518. In one embodiment, operation 508 may include correcting timing references for the communication units for zero propagation time (e.g., infinite propagation velocity) from a system-wide local coordinate system origin.

Operation 510 may take either the results of operation 508 or 514 or both and use it to adjust the unit's fundamental timing. This fundamental timing may include both location functions and wireless data link functions. After operation 510, procedure 500 may be repeated when the system is running.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

A synchronous wireless communication system and method for locating and tracking communication units allows for system synchronization and communication unit location when GPS signals are not available or are being jammed has been described. In various embodiments, the system and method is robust, substantially autonomous, and may be substantially jam-resistant. The system and method of various embodiments do not require complete reliance on GPS signals, which may be jammed or otherwise unable to be accurately received.

In the various embodiments, the system and method do not necessarily accumulate relative location errors over time between system elements. The system and method are not necessarily effected by battlefield smoke or fog and may be used day or night. The system and method do not necessarily require a terrain database. In some embodiments, computations may be performed by CPU's already within the communication device. The many embodiments of the present invention allow it to be adapted to most wireless data link systems regardless of the platform.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for maintaining substantial synchronization among a plurality of communication units in motion that communicate with a reference unit using synchronous wireless communications, wherein the communication units are substantially synchronized with each other, the method comprising:
    establishing, by each of the communication units, a synchronous communication link with the reference unit, each communication unit transmitting during a preassigned time-slot of a synchronized frame;
    eavesdropping on the communications between other communication units and the reference unit to determine one-way propagation delays for at least some of the other communication units;
    calculating a location of at least one of the communication units from the propagation delays; and
    generating a timing-reference signal for frame synchronization from the calculated location.

2. The method of claim 1 wherein the timing-reference signal is derived from GPS signals received by the communication units when the GPS signals are available,
    wherein the timing-reference signal is generated from the calculated location when GPS signals are not available, the timing-reference signal being substantially synchronized for each of the communication units,
    wherein the method further comprises reporting the calculated location to the reference unit over the synchronous communication link,
    wherein the reference unit redirects a trajectory of at least one of the communication units based on the calculated location, and
    wherein the reference unit is substantially stationary with respect to the communication units in motion.

3. The method of claim 1 wherein the timing-reference signal is generated based on a previously determined location for at least one of the communication units and trajectory extrapolations for the communication units, the timing-reference signal being substantially synchronized for each of the communication units to indicate the beginning of the synchronized frame, and
    wherein each communication unit calculates the location of at least one of the communication units from the propagation delays based on hyperbolic intersections and using a known location of the reference unit.

4. The method of claim 3 wherein the method includes the communication units generating a the self-synchronization signal when GPS signals are not available.

5. The method of claim 1 wherein the determined propagation delays are based on a time-delay between the beginning of the frame and receipt of the communication from at least some of the other communication units.

6. The method of claim 1 further comprising receiving propagation delays at a current communication units from at least some of the other communication units and calculating locations of at least some of the communication units using the received propagation delays, wherein calculating includes calculating a location for the current communication unit.

7. The method of claim 1 further comprising reporting the propagation delays to at least some of the other communication units.

8. The method of claim 6 further comprising sending the calculated locations to at least one of the other communication units.

9. The method as claimed in claim 1 further comprising correcting a timing reference for the communication units for zero propagation time from a system-wide local coordinate system origin.

10. A synchronous wireless communication system comprising a plurality of communication units in motion synchronized with an internally generated timing-reference signal wherein the communication units eavesdrop on synchronized communications between other communication units and a reference unit to determine propagation delays for the other communication units, exchange location information with at least some of the other communication units, and generate the timing-reference signal for frame synchronization based on the location information,
    wherein the communication units each establish the synchronous communications over a link with the reference unit and transmit during a preassigned time slot of a synchronized frame.

11. The system of claim 10 wherein the location information includes the propagation delays, and wherein the communication units include guided projectiles and/or missiles,
    wherein target information for at least one of the communication units is updated by a controlling communication unit based on the location information for the one communication unit,
    wherein the communication units report the calculated location to the reference unit over the synchronous communication link,
    wherein the reference unit redirects a trajectory of at least one of the communication units based on its location, and
    wherein the reference unit is substantially stationary with respect to the communication units in motion.

12. The system of claim 11 wherein the communication units correct a timing reference for zero propagation time from a system-wide local coordinate system origin.

13. A communication unit to operate as part of a synchronous wireless communication system, the communication unit comprising:

a data receiver/transmitter to communicate with a reference unit within preassigned time-slots of a synchronized communication frame;

a time of arrival (TOA) determinator to determine propagation delays associated with communications received by eavesdropping on communications between other communication units and the reference unit based on time-slots assigned to the other communication units; and a self-synchronization signal generator to generate a timing-reference signal for frame synchronization with the other communication units based on the propagation delays when GPS signals are not available for synchronization, wherein the timing-reference signal is generated based on the propagation delays determined for the other communication units.

14. The communication unit of claim 13 further comprising a synchronization element that includes a disciplined oscillator responsive to the timing-reference signal to generate a clock signal during the duration of the synchronized communication frames wherein the communication unit reports the calculated location to the reference unit over the synchronous communication link, wherein the reference unit redirects a trajectory of the communication unit based on its reported location, and wherein the reference unit is substantially stationary with respect to the communication units in motion.

15. The communication unit of claim 14 further comprising a GPS receiver to generate the timing-reference signal when GPS signals are received by the communication unit, and wherein the self-synchronization signal generator refrains from generating the timing-reference signal when usable GPS signals are received.

16. The communication unit of claim 13 wherein the communication unit is two-way portable radio.

17. The communication unit of claim 13 wherein the communication unit is located on a guided projectile, missile or aircraft, and the other communication units include a ground station, other guided projectiles, missiles or aircraft.

* * * * *